US006868040B2

(12) United States Patent
Vinegar et al.

(10) Patent No.: US 6,868,040 B2
(45) Date of Patent: Mar. 15, 2005

(54) WIRELESS POWER AND COMMUNICATIONS CROSS-BAR SWITCH

(75) Inventors: Harold J. Vinegar, Houston, TX (US); Mark Christopher Haase, Chardon, OH (US)

(73) Assignee: Shell Oil Company, Houston, TX (US)

( * ) Notice: Subject to any disclaimer, the term of this patent is extended or adjusted under 35 U.S.C. 154(b) by 283 days.

(21) Appl. No.: 10/220,652

(22) PCT Filed: Mar. 2, 2001

(86) PCT No.: PCT/US01/06747
§ 371 (c)(1),
(2), (4) Date: Nov. 8, 2002

(87) PCT Pub. No.: WO01/55555
PCT Pub. Date: Aug. 2, 2001

(65) Prior Publication Data
US 2003/0227393 A1 Dec. 11, 2003

Related U.S. Application Data
(60) Provisional application No. 60/186,378, filed on Mar. 2, 2000.

(51) Int. Cl.[7] .................................................. B01V 3/00
(52) U.S. Cl. .................. 367/82; 340/854.4; 340/854.3; 340/854.8; 166/73; 325/295
(58) Field of Search ........................ 340/854.3, 854.8, 340/854.4; 367/82; 166/73; 325/295

(56) References Cited

U.S. PATENT DOCUMENTS

| 525,663 | A | 9/1894 | Mottinger |
| 2,917,004 | A | 12/1959 | Davis et al. |
| 3,083,771 | A | 4/1963 | Chapman |
| 3,247,904 | A | 4/1966 | Wakefield, Jr. |

(List continued on next page.)

FOREIGN PATENT DOCUMENTS

| EP | 28296 | 5/1981 | ........... E21B/47/12 |
| EP | 295178 | 12/1988 | ........... E21B/47/12 |
| EP | 339825 A1 | 11/1989 | ........... E21B/47/12 |
| EP | 492856 A2 | 7/1992 | ............ H04B/1/62 |

(List continued on next page.)

OTHER PUBLICATIONS

Brown.Connolizo and Robertson, West Texas Oil Lifting Short Course and H.W. Winkler, "Misunderstood or overlooked Gas–Lift Design and Equipment Considerations," SPE, p. 351 (1994).

Der Spek, Alex, and Aliz Thomas, "Neural–Net Identification of Flow Regime with Band Spectra of Flow–Generated Sound", SPE Reservoir Eva. & Eng.2 (6) Dec. 1999, pp. 489–498.

(List continued on next page.)

Primary Examiner—Albert K. Wong

(57) ABSTRACT

A petroleum well for producing petroleum products that incorporates a system adapted to controllably route communications and/or electrical power having a time-varying current through a piping structure in the well, and methods of producing petroleum products use such a well, are provided by the present invention. The system comprises a first induction choke, a second induction choke, and a controllable switch. The first induction choke is located about a portion of a first branch of the piping structure. The second induction choke is located about a portion of a second branch of the piping structure. The controllable switch having two switch terminals. A first of the switch terminals I is electrically connected to the piping structure on a junction side of the induction chokes. The first and second branches of the piping structure intersect on the junction side of the induction chokes. A second of the switch terminals is electrically connected to the piping structure on another side of at least one of the induction chokes.

38 Claims, 6 Drawing Sheets

U.S. PATENT DOCUMENTS

| | | | |
|---|---|---|---|
| 3,427,989 A | 2/1969 | Bostock et al. | |
| 3,566,963 A | 3/1971 | Blackledge | 166/189 |
| 3,602,305 A | 8/1971 | Kisling, III | 116/134 |
| 3,732,728 A | 5/1973 | Fitzpatrick | 73/151 |
| 3,793,632 A | 2/1974 | Still | 340/18 |
| 3,814,545 A | 6/1974 | Waters | 417/90 |
| 3,837,618 A | 9/1974 | Juhel | 251/129 |
| 3,980,826 A | 9/1976 | Widmer | 178/68 |
| 4,068,717 A | 1/1978 | Needham | 166/272 |
| 4,087,781 A | 5/1978 | Grossi et al. | 340/18 |
| 4,295,795 A | 10/1981 | Gass et al. | 417/111 |
| 4,393,485 A | 7/1983 | Redden | 367/25 |
| 4,468,665 A | 8/1984 | Thawley et al. | |
| 4,545,731 A | 10/1985 | Canalizo et al. | 417/86 |
| 4,576,231 A | 3/1986 | Dowling et al. | 166/248 |
| 4,578,675 A | 3/1986 | MacLeod | |
| 4,596,516 A | 6/1986 | Scott et al. | 417/58 |
| 4,630,243 A | 12/1986 | MacLeod | 367/82 |
| 4,648,471 A | 3/1987 | Bordon | |
| 4,662,437 A | 5/1987 | Renfro | 166/65.1 |
| 4,681,164 A | 7/1987 | Stacks | 166/304 |
| 4,709,234 A | 11/1987 | Forehand et al. | |
| 4,738,313 A | 4/1988 | McKee | 166/372 |
| 4,739,325 A | 4/1988 | MacLeod | 340/854 |
| 4,839,644 A | 6/1989 | Safinya et al. | |
| 4,886,114 A | 12/1989 | Perkins et al. | 166/65.1 |
| 4,901,069 A | 2/1990 | Veneruso | 340/853 |
| 4,972,704 A | 11/1990 | Wellington et al. | 73/155 |
| 4,981,173 A | 1/1991 | Perkins et al. | 166/66.4 |
| 5,001,675 A | 3/1991 | Woodward | 367/13 |
| 5,008,664 A | 4/1991 | More et al. | 340/854 |
| 5,130,706 A | 7/1992 | Van Steenwyk | |
| 5,134,285 A | 7/1992 | Perry et al. | 250/269 |
| 5,160,925 A | 11/1992 | Dailey et al. | 340/853.3 |
| 5,162,740 A | 11/1992 | Jewell | 324/347 |
| 5,172,717 A | 12/1992 | Boyle et al. | 137/155 |
| 5,176,164 A | 1/1993 | Boyle | 137/155 |
| 5,191,326 A | 3/1993 | Montgomery | 340/855.5 |
| 5,230,383 A | 7/1993 | Pringle et al. | 166/66.4 |
| 5,246,860 A | 9/1993 | Hutchins et al. | 436/27 |
| 5,251,328 A | 10/1993 | Shaw | 455/73 |
| 5,257,663 A | 11/1993 | Pringle et al. | 166/66.4 |
| 5,267,469 A | 12/1993 | Espinoza | 73/40.5 |
| 5,278,758 A | 1/1994 | Perry et al. | 364/422 |
| 5,331,318 A | 7/1994 | Montgomery | 340/855.4 |
| 5,353,627 A | 10/1994 | Diatschenko et al. | 73/19.03 |
| 5,358,035 A | 10/1994 | Grudzinski | 166/53 |
| 5,367,694 A | 11/1994 | Ueno | |
| 5,394,141 A | 2/1995 | Soulier | 340/854.4 |
| 5,396,232 A | 3/1995 | Mathieu et al. | 340/854.5 |
| 5,425,424 A | 6/1995 | Reinhardt et al. | 166/377 |
| 5,447,201 A | 9/1995 | Mohn | 166/375 |
| 5,458,200 A | 10/1995 | Lagerlef et al. | 166/372 |
| 5,467,083 A | 11/1995 | McDonald et al. | |
| 5,473,321 A | 12/1995 | Goodman et al. | 340/854.9 |
| 5,493,288 A | 2/1996 | Henneuse | |
| 5,531,270 A | 7/1996 | Fletcher et al. | |
| 5,561,245 A | 10/1996 | Georgi et al. | 73/152.02 |
| 5,574,374 A | 11/1996 | Thompson et al. | |
| 5,576,703 A | 11/1996 | MacLeod et al. | |
| 5,587,707 A | 12/1996 | Dickie et al. | 340/870.09 |
| 5,592,438 A | 1/1997 | Rorden et al. | 367/83 |
| 5,662,165 A | 9/1997 | Tubel et al. | 166/250.01 |
| 5,723,781 A | 3/1998 | Pruett et al. | 73/152.18 |
| 5,730,219 A | 3/1998 | Tubel et al. | 66/250.01 |
| 5,745,047 A | 4/1998 | Van Gisbergen et al. | 340/853.1 |
| 5,782,261 A | 7/1998 | Becker et al. | 137/155 |
| 5,797,453 A | 8/1998 | Hisaw | 166/117.5 |
| 5,881,807 A | 3/1999 | Boe et al. | 166/100 |
| 5,883,516 A | 3/1999 | Van Steenwyk et al. | |
| 5,887,657 A | 3/1999 | Bussear | |
| 5,896,924 A | 4/1999 | Carmody et al. | 166/53 |
| 5,934,371 A | 8/1999 | Bussear et al. | 166/53 |
| 5,937,945 A | 8/1999 | Bussear et al. | 166/250.15 |
| 5,941,307 A | 8/1999 | Tubel | 166/313 |
| 5,942,990 A * | 8/1999 | Smith et al. | 340/853.7 |
| 5,955,666 A | 9/1999 | Mullins | 73/52.18 |
| 5,959,499 A | 9/1999 | Khan et al. | 330/149 |
| 5,960,883 A | 10/1999 | Tubel et al. | 166/313 |
| 5,963,090 A | 10/1999 | Fukuchi | 330/149 |
| 5,971,072 A | 10/1999 | Huber et al. | 166/297 |
| 5,975,204 A | 11/1999 | Tubel et al. | 166/250.15 |
| 5,995,020 A | 11/1999 | Owens et al. | 340/854.9 |
| 6,012,015 A | 1/2000 | Tubel | 702/6 |
| 6,012,016 A | 1/2000 | Bilden et al. | 702/12 |
| 6,070,608 A | 6/2000 | Pringle | |
| 6,123,148 A | 9/2000 | Oneal | 166/118 |
| 6,148,915 A | 11/2000 | Mullen et al. | 166/278 |
| 6,192,983 B1 | 2/2001 | Neuroth et al. | 166/250.15 |
| 6,208,586 B1 | 3/2001 | Rorden et al. | 367/35 |
| 6,334,486 B1 | 1/2002 | Carmody et al. | 166/53 |
| 6,348,876 B1 * | 2/2002 | Wei et al. | 340/854.9 |
| 6,420,976 B1 * | 7/2002 | Baggs et al. | 340/853.3 |
| 6,445,307 B1 * | 9/2002 | Rassi et al. | 340/854.6 |
| 6,484,800 B2 | 11/2002 | Carmody et al. | 166/53 |
| 6,515,592 B1 * | 2/2003 | Babour et al. | 340/854.4 |
| 6,633,236 B2 * | 10/2003 | Vinegar et al. | 340/854.4 |
| 6,747,569 B2 * | 6/2004 | Hill et al. | 340/855.8 |

FOREIGN PATENT DOCUMENTS

| | | | |
|---|---|---|---|
| EP | 641916 A2 | 3/1995 | E21B/33/124 |
| EP | 681090 A2 | 11/1995 | E21B/47/18 |
| EP | 697500 A2 | 2/1996 | E21B/49/00 |
| EP | 721053 A1 | 7/1996 | E21B/47/12 |
| EP | 732053 A1 | 9/1996 | A21C/9/04 |
| EP | 919696 A2 | 6/1999 | E21B/47/12 |
| EP | 922835 A3 | 6/1999 | E21B/43/14 |
| EP | 930518 A2 | 7/1999 | G01V/3/12 |
| EP | 964134 A2 | 12/1999 | E21B/47/12 |
| EP | 972909 A2 | 1/2000 | E21B/44/00 |
| EP | 999341 A2 | 5/2000 | E21B/33/124 |
| FR | 2677134 | 12/1992 | E21B/47/12 |
| GB | 2083321 A | 3/1982 | H04B/5/00 |
| GB | 2325949 A | 12/1998 | E21B/43/12 |
| GB | 2327695 | 2/1999 | E21B/43/12 |
| GB | 2 330 853 | 5/1999 | E21B/43/12 |
| WO | 80/00727 | 4/1980 | E21B/47/12 |
| WO | 93/26115 | 12/1993 | H04N/1/40 |
| WO | 96/24747 | 8/1996 | E21B/43/12 |
| WO | 97/16751 | 5/1997 | G01V/3/00 |
| WO | 97/37103 | 10/1997 | E21B/47/01 |
| WO | 98/20233 | 5/1998 | E21B/43/40 |
| WO | 99/37044 | 7/1999 | H04B/13/02 |
| WO | 99/57417 | 11/1999 | E21B/41/00 |
| WO | 99/60247 | 11/1999 | E21B/43/12 |
| WO | 00/04275 | 1/2000 | E21B/47/01 |
| WO | 00/37770 | 6/2000 | E21B/37/06 |
| WO | 01/20126 A2 | 3/2001 | E21B/43/12 |
| WO | 01 55555 | 8/2001 | E21B/47/12 |

OTHER PUBLICATIONS

Sakata et al., "Performance Analysis of Long Distance Transmitting of Magnetic Signal on Cylindrical Steel Rod", IEEE Translation Journal on magnetics in Japan, vol. 8, No. 2. Feb. 1993,, pps. 102–106.

Otis Engineering, Aug. 1980, "Heavy Crude Lift System", Field Development Report, OEC 5228, Otis Corp., Dallas, Texas, 1980.

* cited by examiner

WIRELESS POWER AND COMMUNICATIONS CROSS-BAR SWITCH

This application claims benefit of Provisional Application No. 60/186,378 filed Mar. 2, 2000.

CROSS-REFERENCES TO RELATED APPLICATIONS

This application claims the benefit of the following U.S. Provisional Applications, all of which are hereby incorporated by reference:

COMMONLY OWNED AND PREVIOUSLY FILED U.S. PROVISIONAL PATENT APPLICATIONS

| T&K # | Serial Number | Title | Filing Date |
|---|---|---|---|
| TH 1599 | 60/177,999 | Toroidal Choke Inductor for Wireless Communication and Control | Jan. 24, 2000 |
| TH 1600 | 60/178,000 | Ferromagnetic Choke in Wellhead | Jan. 24, 2000 |
| TH 1602 | 60/178,001 | Controllable Gas-Lift Well and Valve | Jan. 24, 2000 |
| TH 1603 | 60/177,883 | Permanent, Downhole, Wireless, Two-Way Telemetry Backbone Using Redundant Repeater, Spread Spectrum Arrays | Jan. 24, 2000 |
| TH 1668 | 60/177,998 | Petroleum Well Having Downhole Sensors, Communication, and Power | Jan. 24, 2000 |
| TH 1669 | 60/177,997 | System and Method for Fluid Flow Optimization | Jan. 24, 2000 |
| TS 6185 | 60/181,322 | A Method and Apparatus for the Optimal Predistortion of an Electromagnetic Signal in a Downhole Communications System | Feb. 9, 2000 |
| TH 1599x | 60/186,376 | Toroidal Choke Inductor for Wireless Communication and Control | Mar. 2, 2000 |
| TH 1600x | 60/186,380 | Ferromagnetic Choke in Wellhead | Mar. 2, 2000 |
| TH 1601 | 60/186,505 | Reservoir Production Control from Intelligent Well Data | Mar. 2, 2000 |
| TH 1671 | 60/186,504 | Tracer Injection in a Production Well | Mar. 2, 2000 |
| TH 1672 | 60/186,379 | Oilwell Casing Electrical Power Pick-Off Points | Mar. 2, 2000 |
| TH 1673 | 60/186,394 | Controllable Production Well Packer | Mar. 2, 2000 |
| TH 1674 | 60/186,382 | Use of Downhole High Pressure Gas in a Gas Lift Well | Mar. 2, 2000 |
| TH 1675 | 60/186,503 | Wireless Smart Well Casing | Mar. 2, 2000 |
| TH 1677 | 60/186,527 | Method for Downhole Power Management Using Energization from Distributed Batteries or Capacitors with Reconfigurable Discharge | Mar. 2, 2000 |
| TH 1679 | 60/186,393 | Wireless Downhole Well Interval Inflow and Injection Control | Mar. 2, 2000 |
| TH 1681 | 60/186,394 | Focused Through-Casing Resistivity Measurement | Mar. 2, 2000 |
| TH 1704 | 60/186,531 | Downhole Rotary Hydraulic Pressure for Valve Actuation | Mar. 2, 2000 |
| TH 1705 | 60/186,377 | Wireless Downhole Measurement and Control For Optimizing Gas Lift Well and Field Performance | Mar. 2, 2000 |
| TH 1722 | 60/186,381 | Controlled Downhole Chemical Injection | Mar. 2, 2000 |
| TH 1723 | 60/186,378 | Wireless Power and Communications Cross-Bar Switch | Mar. 2, 2000 |

The current application shares some specification and figures with the following commonly owned and concurrently filed applications, all of which are hereby incorporated by reference:

COMMONLY OWNED AND CONCURRENTLY FILED U.S PATENT APPLICATIONS

| T&K # | Serial Number | Title | Filing Date |
|---|---|---|---|
| TH 1601US | 09/____ | Reservoir Production Control from Intelligent Well Data | |
| TH 1671US | 09/____ | Tracer Injection in a Production Well | |
| TH 1672US | 09/____ | Oil Well Casing Electrical Power Pick-Off Points | |
| TH 1673US | 09/____ | Controllable Production Well Packer | |
| TH 1674US | 09/____ | Use of Downhole High Pressure Gas in a Gas-Lift Well | |
| TH 1675US | 09/____ | Wireless Smart Well Casing | |
| TH 1677US | 09/____ | Method for Downhole Power Management Using Energization from Distributed Batteries or Capacitors with Reconfigurable Discharge | |
| TH 1679US | 09/____ | Wireless Downhole Well Interval Inflow and Injection Control | |

-continued

| COMMONLY OWNED AND CONCURRENTLY FILED U.S PATENT APPLICATIONS | | | |
|---|---|---|---|
| T&K # | Serial Number | Title | Filing Date |
| TH 1681US | 09/____ | Focused Through-Casing Resistivity Measurement | |
| TH 1704US | 09/____ | Downhole Rotary Hydraulic Pressure for Valve Actuation | |
| TH 1705US | 09/____ | Wireless Downhole Measurement and Control For Optimizing Gas Lift Well and Field Performance | |
| TH 1722US | 09/____ | Controlled Downhole Chemical Injection | |

The current application shares some specification and figures with the following commonly owned and previously filed applications, all of which are hereby incorporated by reference:

| COMMONLY OWNED AND PREVIOUSLY FILED U.S PATENT APPLICATIONS | | | |
|---|---|---|---|
| T&K # | Serial Number | Title | Filing Date |
| TH 1599US | 09/____ | Choke Inductor for Wireless Communication and Control | |
| TH 1600US | 09/____ | Induction Choke for Power Distribution in Piping Structure | |
| TH 1602US | 09/____ | Controllable Gas-Lift Well and Valve | |
| TH 1603US | 09/____ | Permanent Downhole, Wireless, Two-Way Telemetry Backbone Using Redundant Repeater | |
| TH 1668US | 09/____ | Petroleum Well Having Downhole Sensors, Communication, and Power | |
| TH 1669US | 09/____ | System and Method for Fluid Flow Optimization | |
| TH 1783US | 09/____ | Downhole Motorized Flow Control Valve | |
| TS 6185US | 09/____ | A Method and Apparatus for the Optimal Predistortion of an Electro Magnetic Signal in a Downhole Communications System | |

The benefit of 35 U.S.C. § 120 is claimed for all of the above referenced commonly owned applications. The applications referenced in the tables above are referred to herein as the "Related Applications."

BACKGROUND

1. Field of the Invention

The present invention relates to a system for controllably routing power and/or communications through a network of interconnected members of a piping structure or a metal structure using individually controllable switches and induction chokes. In one aspect, it relates to a petroleum production well and a method of operating the well to provide a controllable downhole switching network for routing power and/or communications to downhole devices.

2. Description of Related Art

Several methods have been devised to place controllable valves and other devices and sensors downhole on a tubing string in a well, but all such known devices typically use an electrical cable along the tubing string to power and communicate with the devices and sensors. It is undesirable and in practice difficult to use a cable along the tubing string either integral with the tubing string or spaced in the annulus between the tubing and the casing because of the number of failure mechanisms are present in such a system. Other methods of communicating within a borehole are described in U.S. Pat. Nos. 5,493,288; 5,576,703; 5,574,374; 5,467,083; and 5,130,706.

U.S. Pat. No. 6,070,608 describes a surface controlled gas lift valve for use in oil wells. Methods of actuating the valve include electro-hydraulic, hydraulic, and pneumo-hydraulic. Sensors relay the position of the variable orifice and critical fluid pressures to a panel on the surface. However, when describing how electricity is provided to the downhole sensors and valves, the means of getting the electric power/signal to the valves/sensors is described as an electrical conduit that connects between the valve/sensor downhole and a control panel at the surface. U.S. Pat. No. 6,070,608 does not specifically describe or show the current path from the device downhole to the surface. The electrical conduit is shown in the figures as a standard electrical conduit, i.e., an extended pipe with individual wires protected therein, such that the pipe provides physical protection and the wires therein provide the current path. But such standard electrical conduits can be difficult to route at great depths, around turns for deviated wells, along multiple branches for a well having multiple lateral branches, and/or in parallel with coil production tubing. Hence, there is a need for a system and method of providing power and communications signals to downhole devices without the need for a separate electrical conduit filled with wires and strung along side of production tubing.

U.S. Pat. No. 4,839,644 describes a method and system for wireless two-way communications in a cased borehole having a tubing string. However, this system describes a downhole toroid antenna for coupling electromagnetic energy in a waveguide TEM mode using the annulus between the casing and the tubing. This toroid antenna uses an electromagnetic wave coupling that requires a substantially nonconductive fluid (such as refined, heavy oil) in the annulus between the casing and the tubing as a transmission medium, as well as a toroidal cavity and wellhead insulators. Therefore, the method and system described in U.S. Pat. No. 4,839,644 is expensive, has problems with brine leakage into the casing, and is difficult to use for downhole two-way communication. Thus, a need exists for a better system and method of providing power and communications signals to downhole devices without the need for a nonconductive fluid to be present in the annulus between the casing and tubing.

Other downhole communication concepts, such as mud pulse telemetry (U.S. Pat. Nos. 4,648,471 and 5,887,657), have shown successful communication at low data rates but are of limited usefulness as a communication scheme where high data rates are required or it is undesirable to have complex, mud pulse telemetry equipment downhole. Still other downhole communication methods have been attempted, see U.S. Pat. Nos. 5,467,083; 4,739,325; 4,578,675; 5,883,516; and 4,468,665. Hence, there is a need for a system and method of providing power and communications signals to downhole devices at higher data rates and with available power to operate a downhole device.

It would, therefore, be a significant advance in the operation of petroleum wells if tubing, casing, liners, and/or other conductors installed in wells could be used for the communication and power conductors to control and operate devices and sensors downhole in a petroleum well.

Induction chokes have been used in connection with sensitive instrumentation to protect against surges and stray voltage. For example, most personal computers have some sort of choke incorporated into its AC power cord for such protection. Such protection chokes work well for their intended purpose, but do not operate to define a power or communication circuit.

All references cited herein are incorporated by reference to the maximum extent allowable by law. To the extent a reference may not be fully incorporated herein, it is incorporated by reference for background purposes, and indicative of the knowledge of one of ordinary skill in the art.

BRIEF SUMMARY OF THE INVENTION

The problems and needs outlined above are largely solved and met by the present invention. In accordance with one aspect of the present invention, a system for controllably routing communications and electrical power having a time-varying current through a piping structure is provided. The system comprises a first induction choke, a second induction choke, and a controllable switch. The first induction choke is located about a portion of a first branch of the piping structure. The second induction choke is located about a portion of a second branch of the piping structure. The controllable switch comprises two switch terminals. A first of the switch terminals is electrically connected to the piping structure on a junction side of the induction chokes. The first and second branches of the piping structure intersect on the junction side of the induction chokes. A second of the switch terminals is electrically connected to the piping structure on another side of at least one of the induction chokes.

In accordance with another aspect of the present invention, a petroleum well for producing petroleum products is provided. The petroleum well comprises a piping structure and a system for controllably routing communications and/or electrical power having a time-varying current through the piping structure. The piping structure extends within the well. The system comprises a first induction choke, a second induction choke, and a controllable switch. The first induction choke is located about a portion of a first branch of the piping structure. The second induction choke is located about a portion of a second branch of the piping structure. The controllable switch comprises two switch terminals. A first of the switch terminals is electrically connected to the piping structure on a junction side of the induction chokes, where the first and second branches of the piping structure intersect on the junction side of the induction chokes. A second of the switch terminals is electrically connected to the piping structure on another side of at least one of the induction chokes.

In accordance with yet another aspect of the present invention, a petroleum well for producing petroleum products is provided. The petroleum well comprises a well casing, a production tubing, a power source, a first induction choke, a second induction choke, a controllable switch, and two downhole devices. The well casing extends into a formation, and the production tubing extends within the casing. The power source is located at the surface. The power source is electrically connected to, and adapted to output a time-varying current into, the tubing and/or the casing. The first induction choke is located downhole about a portion of a first branch of the tubing and/or the casing. The second induction choke is located downhole about a portion of a second branch of the tubing and/or the casing. The controllable switch is located downhole and comprises two switch terminals. A first of the switch terminals is electrically connected to the tubing and/or the casing on a junction side of the induction chokes. The first and second branches intersect on the junction side of the induction chokes. The second of the switch terminals is electrically connected to the tubing and/or the casing on another side of the first induction choke and/or the second induction choke. A first downhole device is electrically connected to the first branch. A second downhole device is electrically connected to the second branch.

In accordance with still another aspect of the present invention, a method of producing petroleum products from a petroleum well is provided. The method comprises the following steps (the order of which may vary): (i) providing a piping structure that extends within the well; (ii) providing an electrical power source that is located at the surface, that is electrically connected to the piping structure, and that is adapted to output a time-varying current; (iii) providing a first induction choke that is located about a portion of a first branch of the piping structure; (iv) providing a second induction choke that is located about a portion of a second branch of the piping structure; (v) providing a controllable switch that comprises two switch terminals, wherein a first of the switch terminals is electrically connected to the piping structure on a junction side of the induction chokes, wherein the first and second branches of the piping structure intersect on the junction side of the induction chokes, and wherein a second of the switch terminals is electrically connected to the piping structure on another side of at least one of the induction chokes; (vi) providing a downhole device that is electrically connected to the piping structure; (vii) imparting the time-varying current into the piping structure with the power source; (viii) controlling a switch position of the controllable electric switch; (ix) routing the time-varying current around at least one of the induction chokes into at least one of the first and second branches of the piping structure with the controllable electric switch; (x) routing the time-varying current through the downhole device; (xi) providing electrical power to the downhole device during petroleum production operations with the power source via the piping structure; and (xii) producing petroleum products from the well. If the second switch terminal is electrically connected to the first branch of the piping structure on the another side of the first induction choke, and the controllable switch further comprises a third switch terminal, the third switch terminal is electrically connected to the second branch of the piping structure on the another side of the second induction choke. If the second switch terminal is electrically connected to the first branch of the piping structure on the another side of the first induction choke, then the method may further comprise the steps of: (xiii) providing a second controllable switch that is electrically connected between the piping structure on a junction side of the second induction choke and the second branch of the piping structure on the other side of the second induction choke, such that each of the electrically controllable switches are electrically connected across each of the induction chokes, respectively; and (xiv) controlling a switch position of the second controllable electric switch.

Thus, the present invention provides a system and method for the switching and routing of power and/or communications across a network of a piping structure (e.g., tubing and/or casing of a well). The present invention provides a power and communications transmission routing system that is capable of interconnecting each of N input lines to any one or more M output lines, where "lines" are intersecting portions of a piping structure network. Removable and reconfigurable induction chokes provide a way make such routing possible. Controllable and independently addressable switches provide the variable interconnections among the piping structures in the network.

One general application of the present invention is in point-to-point power and/or communications connectivity where the number of input lines (N) and output lines (M) are equal, M=N. The chokes are installed around a portion of each "line" across which no power and/or information conveyance is desired. By installing a total of $N^2-N(=N(N-1))$ chokes between select input-output connections, all power and communications are effectively blocked. The remaining N input-output connections across which no induction chokes are installed do not impede the flow of power or information. A connection could be initiated by bypassing or "shorting-out" the choke using an addressable switch (e.g., a digitally addressable switch). In the event that partial power and communications conveyance across the N-by-N grid is desired, smaller chokes (i.e., less mass, or different magnetic properties) may be installed that do not fully impede the transmission of power and signals.

Another general application of the present invention is in a non-blocking switching network in which any input line (N) may be connected to a plurality of one or more output lines (M), where the number of input lines (N) does not exceed the number of output lines (M). An extreme instance of this application is where N=1 and M is an arbitrary number, thereby defining a star-shaped, or hub and spoke, power and communication topology. Multiple chokes can be used to selectively partition and route power and information to any desired subset of the M output lines. Again, in the event that partial power and communication conveyance is desired, smaller chokes may be employed. Regardless of the application, installation of the induction chokes in selective positions provides for a flexible, reconfigurable power and communications routing mechanism within a piping structure.

BRIEF DESCRIPTION OF THE DRAWINGS

Other objects and advantages of the invention will become apparent upon reading the following detailed description and upon referencing the accompanying drawings, in which.

DETAILED DESCRIPTION OF THE INVENTION

Figure 1:
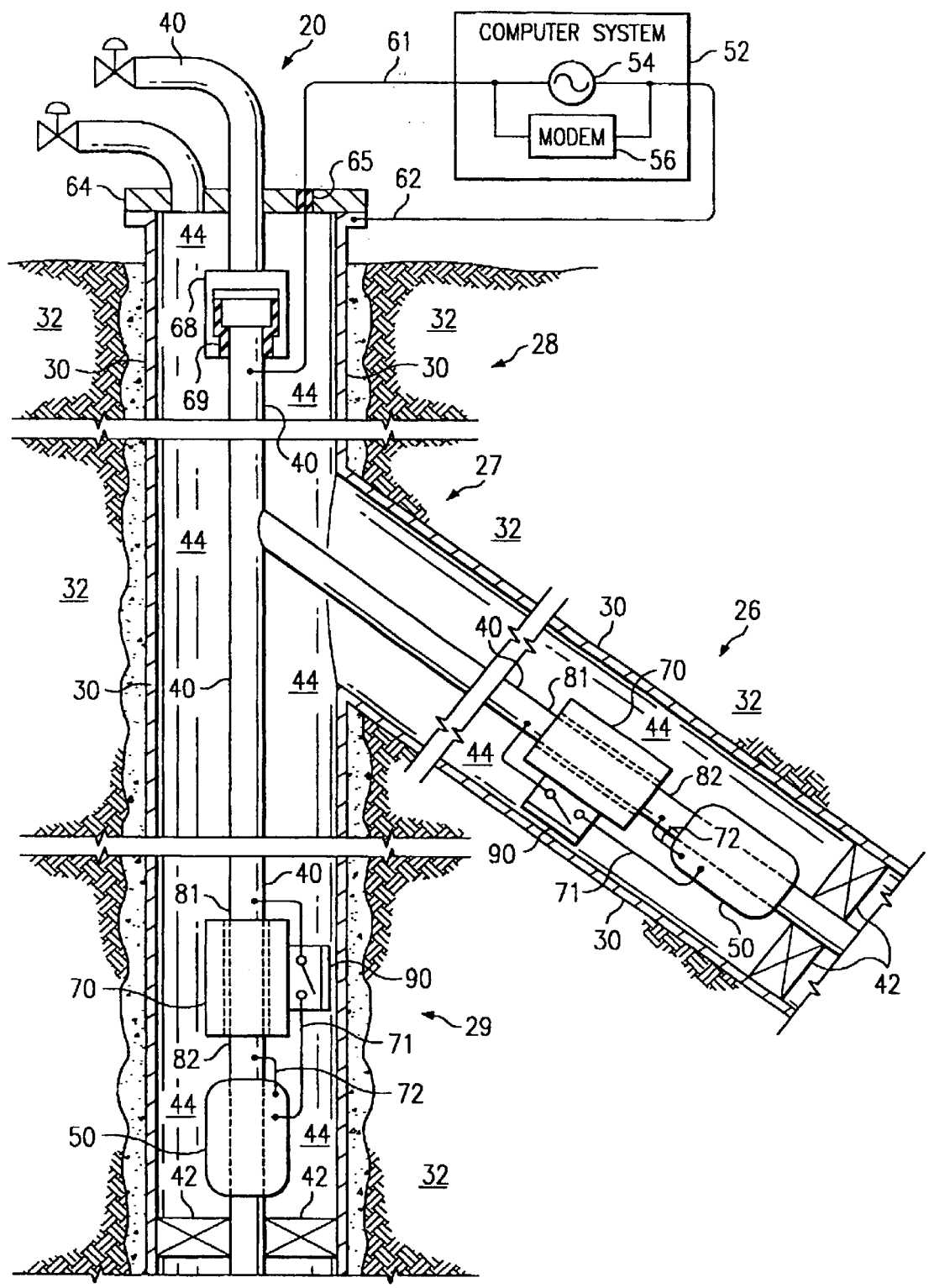
FIG. 1 is a schematic showing a petroleum production well in accordance with a preferred embodiment of the present invention.

Referring now to the drawings, wherein like reference numbers are used herein to designate like elements throughout the various views, preferred embodiments of the present invention are illustrated and further described, and other possible embodiments of the present invention are described. The figures are not necessarily drawn to scale, and in some instances the drawings have been exaggerated and/or simplified in places for illustrative purposes only. One of ordinary skill in the art will appreciate the many possible applications and variations of the present invention based on the following examples of possible embodiments of the present invention, as well as based on those embodiments illustrated and discussed in the Related Applications, which are incorporated by reference herein to the maximum extent allowed by law.

As used in the present application, a "piping structure" can be one single pipe, a tubing string, a well casing, a pumping rod, a series of interconnected pipes, rods, rails, trusses, lattices, supports, a branch or lateral extension of a well, a network of interconnected pipes, or other similar structures known to one of ordinary skill in the art. A preferred embodiment makes use of the invention in the context of a petroleum well where the piping structure comprises tubular, metallic, electrically-conductive pipe or tubing strings, but the invention is not so limited. For the present invention, at least a portion of the piping structure needs to be electrically conductive, such electrically conductive portion may be the entire piping structure (e.g., steel pipes, copper pipes) or a longitudinal extending electrically conductive portion combined with a longitudinally extending non-conductive portion. In other words, an electrically conductive piping structure is one that provides an electrical conducting path from a first portion where a power source is electrically connected to a second portion where a device and/or electrical return is electrically connected. The piping structure will typically be conventional round metal tubing, but the cross-section geometry of the piping structure, or any portion thereof, can vary in shape (e.g., round, rectangular, square, oval) and size (e.g., length, diameter, wall thickness) along any portion of the piping structure. Hence, a piping structure must have an electrically conductive portion extending from a first portion of the piping structure to a second portion of the piping structure, wherein the first portion is distally spaced from the second portion along the piping structure.

The terms "first portion" and "second portion" as used herein are each defined generally to call out a portion, section, or region of a piping structure that may or may not extend along the piping structure, that can be located at any chosen place along the piping structure, and that may or may not encompass the most proximate ends of the piping structure.

The term "modem" is used herein to generically refer to any communications device for transmitting and/or receiving electrical communication signals via an electrical conductor (e.g., metal). Hence, the term "modem" as used herein is not limited to the acronym for a modulator (device that converts a voice or data signal into a form that can be transmitted)/demodulator (a device that recovers an original signal after it has modulated a high frequency carrier). Also, the term "modem" as used herein is not limited to conventional computer modems that convert digital signals to analog signals and vice versa (e.g., to send digital data signals over the analog Public Switched Telephone Network). For example, if a sensor outputs measurements in an analog format, then such measurements may only need to be modulated (e.g., spread spectrum modulation) and transmitted—hence no analog/digital conversion needed. As another example, a relay/slave modem or communication device may only need to identify, filter, amplify, and/or retransmit a signal received.

The term "valve" as used herein generally refers to any device that functions to regulate the flow of a fluid. Examples of valves include, but are not limited to, bellows-type gas-lift valves and controllable gas-lift valves, each of which may be used to regulate the flow of lift gas into a tubing string of a well. The internal and/or external workings of valves can vary greatly, and in the present application, it is not intended to limit the valves described to any particular configuration, so long as the valve functions to regulate flow. Some of the various types of flow regulating mechanisms include, but are not limited to, ball valve configurations, needle valve configurations, gate valve configurations, and cage valve configurations. The methods of installation for valves discussed in the present application can vary widely.

The term "electrically controllable valve" as used herein generally refers to a "valve" (as just described) that can be opened, closed, adjusted, altered, or throttled continuously in response to an electrical control signal (e.g., signal from a surface computer or from a downhole electronic controller module). The mechanism that actually moves the valve position can comprise, but is not limited to: an electric motor; an electric servo; an electric solenoid; an electric switch; a hydraulic actuator controlled by at least one electrical servo, electrical motor, electrical switch, electric solenoid, or combinations thereof; a pneumatic actuator controlled by at least one electrical servo, electrical motor, electrical switch, electric solenoid, or combinations thereof; or a spring biased device in combination with at least one electrical servo, electrical motor, electrical switch, electric solenoid, or combinations thereof. An "electrically controllable valve" may or may not include a position feedback sensor for providing a feedback signal corresponding to the actual position of the valve.

The term "sensor" as used herein refers to any device that detects, determines, monitors, records, or otherwise senses the absolute value of or a change in a physical quantity. A sensor as described herein can be used to measure physical quantities including, but not limited to: temperature, pressure (both absolute and differential), flow rate, seismic data, acoustic data, pH level, salinity levels, tracer presence, tracer concentration, chemical concentration, valve positions, or almost any other physical data.

The phrase "at the surface" as used herein refers to a location that is above about fifty feet deep within the Earth. In other words, the phrase "at the surface" does not necessarily mean sitting on the ground at ground level, but is used more broadly herein to refer to a location that is often easily or conveniently accessible at a wellhead where people may be working. For example, "at the surface" can be on a table in a work shed that is located on the ground at the well platform, it can be on an ocean floor or a lake floor, it can be on a deep-sea oil rig platform, or it can be on the 100th floor of a building. Also, the term "surface" may be used herein as an adjective to designate a location of a component or region that is located "at the surface." For example, as used herein, a "surface" computer would be a computer located "at the surface."

The term "downhole" as used herein refers to a location or position below about fifty feet deep within the Earth. In other words, "downhole" is used broadly herein to refer to a location that is often not easily or conveniently accessible from a wellhead where people may be working. For example in a petroleum well, a "downhole" location is often at or proximate to a subsurface petroleum production zone, irrespective of whether the production zone is accessed vertically, horizontally, lateral, or any other angle therebetween. Also, the term "downhole" is used herein as an adjective describing the location of a component or region. For example, a "downhole" device in a well would be a device located "downhole," as opposed to being located "at the surface."

Also, the term "wireless" as used herein means the absence of a conventional, insulated wire conductor extending from the surface to a downhole device. Using a piping structure of a well (e.g., the tubing and/or casing) as an electrical conductor is considered "wireless."

FIG. 1 is a schematic showing a gas-lift, petroleum production well 20 in accordance with a preferred embodiment of the present invention. The well 20 has a main borehole with a lateral branch 26 extending therefrom. The well 20 in FIG. 1 can be divided into four sections: the lateral branch section 26, a junction section 27, an upper section 28, and a lower main borehole section 29. The lateral branch 26 merges with the main borehole at the junction section 27. The upper section 28 extends from downhole above the junction section 27 to the surface. The well 20 has a well casing 30 extending within the wellbores and through a formation 32 to production zones (not shown) farther downhole. A production tubing 40 extends within the well casing for conveying fluids (e.g., oil, gas) from downhole to the surface during production operations. Packers 42 are located downhole within the casing 30 and about the tubing 40. The packers 42 are conventional and they hydraulically isolate the well sections 26–29 above the production zones to allow pressurized gas to be input into an annulus 44 formed between the casing 30 and tubing 40. During gas-lift operation, pressurized gas is input at the surface into the annulus 44 for further input into the tubing 40 to provide gas-lift for fluids therein. Hence, the petroleum production well 20 shown in FIG. 1 is similar to a conventional well in construction, but with the incorporation of the present invention.

An electrical circuit is formed using various components of the well 20 in FIG. 1. The electrical well circuit formed is used to provide power and/or communications to electrically powered downhole devices 50. A surface computer system 52 provides the power and/or communications at the surface. The surface computer system 52 comprises a power source 54 and a master modem 56, but the surface equipment components and configuration may vary. The power source 54 is adapted to output a time-varying current. The time-varying current is preferably alternating current (AC), but it can also be a varying direct current. Preferably, the communications signal provided by the surface computer system 52 is a spread spectrum signal, but other forms of modulation or predistortion can be used in alternative. A first computer terminal 61 of the surface computer system 52 is electrically connected to the tubing 40 at the surface. The first computer terminal 61 passes through the hanger 64 at an insulated seal 65, and is thus electrically insulated from the hanger 64 as it passes through it at the seal 65. A second computer terminal 62 of the surface computer system 52 is electrically connected to the well casing 30 at the surface.

The tubing 40 and casing 30 act as electrical conductors for the well circuit. In a preferred embodiment, as shown in FIG. 1, the tubing 40 acts as a piping structure for conveying electrical power and/or communications between the surface computer system 52 and the downhole device 50, and the packers 42 and casing 30 act as an electrical return. An insulated tubing joint 68 is incorporated at the upper section below the hanger 64 to electrically insulate the tubing 40 from the hanger 64 and the casing 30 at the surface. The first computer terminal 61 is electrically connected to the tubing 40 below the insulated tubing joint 68.

Induction chokes 70 are located downhole about the tubing 40. Each induction choke 70 is generally ring shaped and is generally concentric about the tubing 40. Each induction choke 70 comprises a ferromagnetic material, and it is unpowered. As described in further detail in the Related Applications, each induction choke 70 functions based on its size (mass), geometry, and magnetic properties, as well as its spatial relationship relative to the tubing 40. In other embodiments (not shown), either or both of the induction chokes 70 may be located about the casing 30.

The downhole devices 50 each have two electrical device terminals 71, 72. A first of the device terminals 71 is electrically connected to the tubing 40 on a source-side 81 of the respective induction choke 70. A second of the device terminals 72 is electrically connected to the tubing 40 on an electrical-return-side 82 of the respective induction choke 70. Each packer 42 provides an electrical connection between the tubing 40 and the casing 30 downhole. However, the tubing 40 and casing 30 may also be electrically connected downhole by a conductive fluid (not shown) in the annulus 44 above the packers 42, or by another way. Preferably there will be little or no conductive fluid in the annulus 44 above each packer 42, but in practice it sometimes cannot be prevented.

Other alternative ways to develop an electrical circuit using a piping structure of a well and at least one induction choke are described in the Related Applications, many of which can be applied in conjunction with the present invention to provide power and/or communications to the electrically powered downhole device 50 and to form other embodiments of the present invention. Notably the Related Applications describe methods based on the use of the casing rather than the tubing to convey power from the surface to downhole devices, and the present invention is applicable in casing-conveyed embodiments.

As shown in FIG. 1, preferably the components of each of the downhole devices 50 are all contained in a single, sealed tubing pod together as one module for ease of handling and installation, as well as to protect the components from the surrounding environment. But in other embodiments of the present invention, the components of the downhole device 50 can be separate (i.e., no tubing pod) or combined in other combinations.

The components of the downhole devices 50 may vary to form many possible embodiments of the present invention. For example, a downhole device 50 may comprise (but is not limited to): an electric servo, another electric motor, a sensor or transducer, transducers, an electrically controllable tracer injection device, an electrically controllable chemical injection device, a chemical or tracer material reservoir, an electrically controllable valve, a modem, a communications and control module, a logic circuit, a computer system, a memory storage device, a microprocessor, a power transformer, a power storage module or device, an electrically controllable hydraulic pump and/or actuator, an electrically controllable pneumatic pump and/or actuator, or any combination thereof. The downhole devices 50 of FIG. 1 each comprises an electrically controllable gas-lift valve (not shown) and a power storage module (not shown).

A controllable, individually addressable, electrical by-pass switch 90 is electrically connected inline along the first device terminal 71 for each of the devices 50. Each of the switches 90 may be controlled by the surface computer system 52 from the surface, by a downhole switch control module (not shown), by another downhole device 50, by its respective downhole device 50, by a control circuit within the switch, or by any combination thereof. For example, each switch control algorithm could be based on a time sequence gauged by an internal clock and in synchronism with or coordinated to alternate with the other switches. The switches 90 can be analog or digital switches. The movement of each of the switches 90 may be driven by a variety of ways known to one of ordinary skill in the art, including (but not limited to): electrical, mechanical, hydraulic, or pneumatic. The energy to control and drive each switch 90 may come from stored energy only, from a rechargeable energy storage device, from the surface (e.g., surface power source 54) via the tubing 40 and/or casing 30, from another downhole device 50 via the a separate wire (not shown), the tubing 40 and/or the casing 30, or any combination thereof. Preferably, each switch 90 can be independently opened or closed as needed or as desired by the surface computer system 52, and each switch 90 is powered by a rechargeable battery that is periodically recharged by the surface power source 54 via the tubing 40 and/or casing 30.

Figure 2:
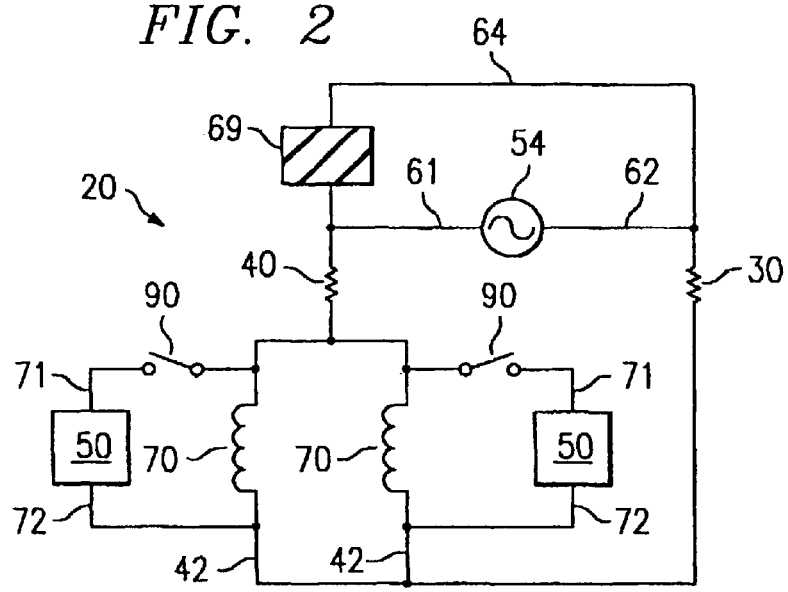
FIG. 2 is a simplified electrical schematic of the electrical circuit formed by the well of FIG. 1.

FIG. 2 is a simplified electrical schematic illustrating the electrical circuit formed in the well 20 of FIG. 1. In operation, power and/or communications (supplied by the surface computer system 52) are imparted into the tubing 40 at the surface below the insulated tubing joint 68 via the first computer terminal 61. The time-varying current is hindered from flowing from the tubing 40 to the casing 30 (and to the second computer terminal 62) via the hanger 64 due to the insulators 69 in the insulated tubing joint 68. However, the time-varying current flows freely downhole along the tubing 40 until the induction chokes 70 are encountered. Each induction choke 70 provides a large inductance that impedes most of the current from flowing through the tubing 40 at each induction choke 70. Hence, a voltage potential forms between the tubing 40 and the casing 30 due to the induction chokes 70. The voltage potential also forms between the tubing 40 on the source-side 81 of each induction choke 70 and the tubing 40 on the electrical-return-side 82 of each induction choke 70. Because the downhole devices 50 are electrically connected across the voltage potentials formed by the chokes 70, most of the current imparted into the tubing 40 that is not lost along the way is routed through the downhole devices 50, and thus provides power and/or communications to the downhole devices 50. The by-pass switches 90 determine which of the downhole devices 50 receive the power and/or communications sent from the surface. If the switch 90 of the lower main borehole section 29 is closed and the switch 90 of the lateral section 26 is open, then the device 50 of the lateral section 26 is not in the electrical loop and most of the current will be routed through the device 50 of the lower main borehole section 29. If the switch 90 of the lower main borehole section 29 is open and the switch 90 of the lateral section 26 is closed, then the device 50 of the lower main borehole section 29 is not in the electrical loop and most of the current will be routed through the device 50 of the lateral section 26. And if both of the switches 90 are closed, then the downhole devices 50 will be in parallel and the current will pass through both of them. After passing through one or both of the downhole devices 50, the current returns to the surface computer system 52 via the packer(s) 42, the casing 30, and the second computer terminal 62. When the current is AC, the flow of the current just described will also be reversed through the well 20 along the same path.

Other alternative ways to develop an electrical circuit using a piping structure of a well and at least one induction choke are described in the Related Applications, many of which can be applied in conjunction with the present invention to provide power and/or communications to the electrically powered downhole devices 50 and to form other embodiments of the present invention.

If other packers or centralizers (not shown) are incorporated between the insulated tubing joint 68 and the packers 42, they can incorporate an electrical insulator to prevent electrical shorts between the tubing 40 and the casing 30. Suitable cenralizers may be composed of solid molded or machined plastic, or may be of the bow-spring type provided these are furnished with electrical isolation components as required. Such electrical insulation of additional packers or centralizers may be achieved in various ways apparent to one of ordinary skill in the art.

Figure 3A:
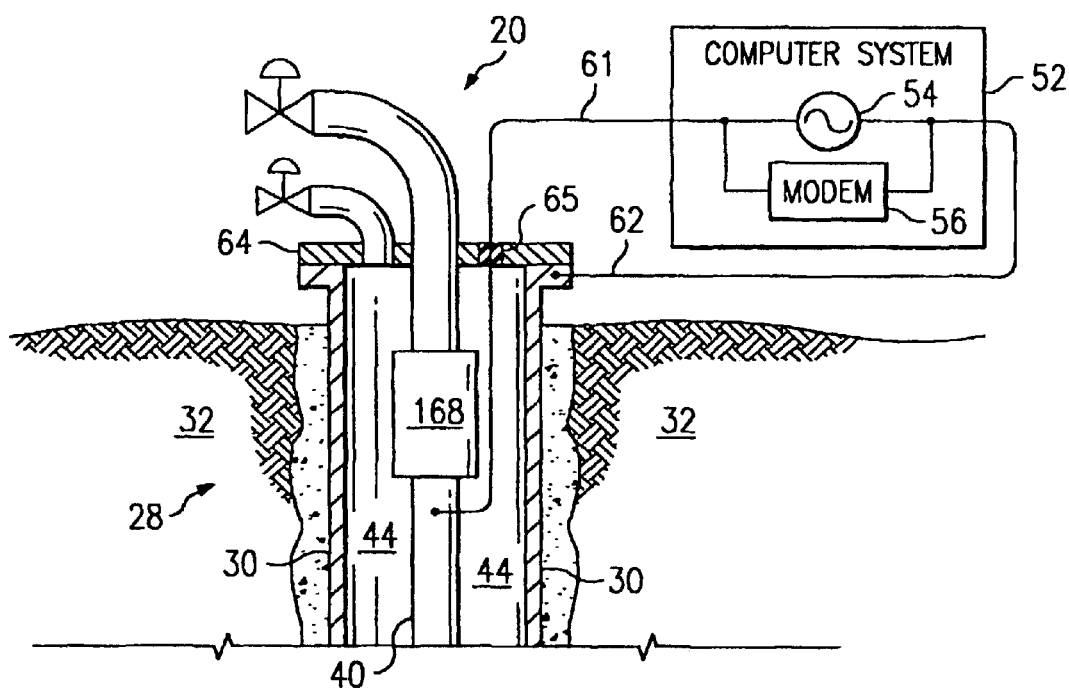
FIG. 3A is a schematic showing an upper portion of a petroleum production well in accordance with another preferred embodiment of the present invention.
Figure 3B:
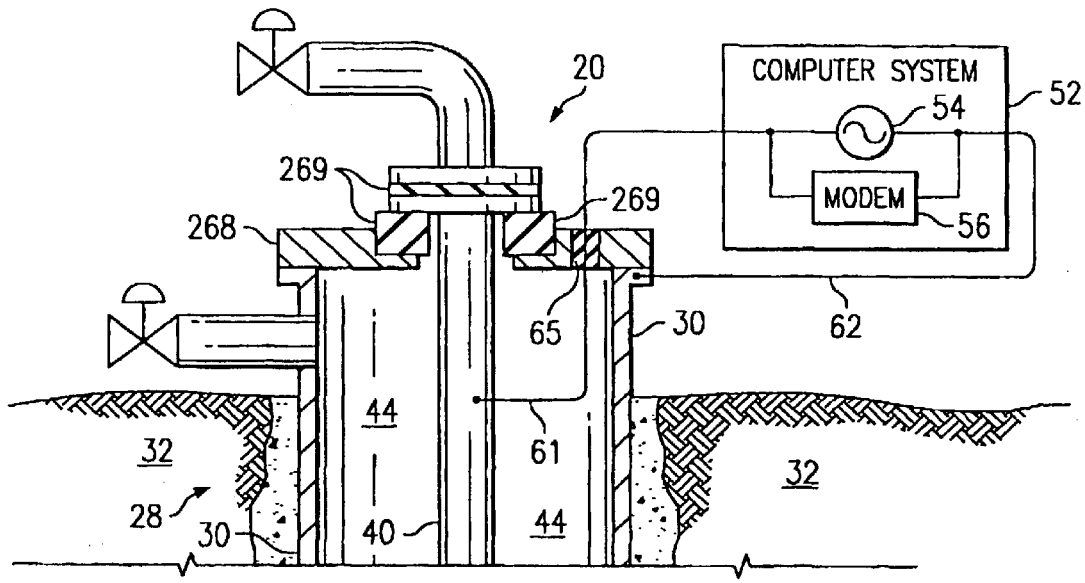
FIG. 3B is a schematic showing an upper portion of a petroleum production well in accordance with yet another preferred embodiment of the present invention.

In alternative to (or in addition to) the insulated tubing joint 68, another induction choke 168 (see FIG. 3A) can be placed about the tubing 40 above the electrical connection location for the first computer terminal 61 to the tubing 40, and/or the hanger 64 may be an insulated hanger 268 (see FIG. 3B) having insulators 269 to electrically insulate the tubing 40 from the casing 30. Thus, the upper portion of the well can vary to form other possible embodiments of the present invention.

Figure 5:
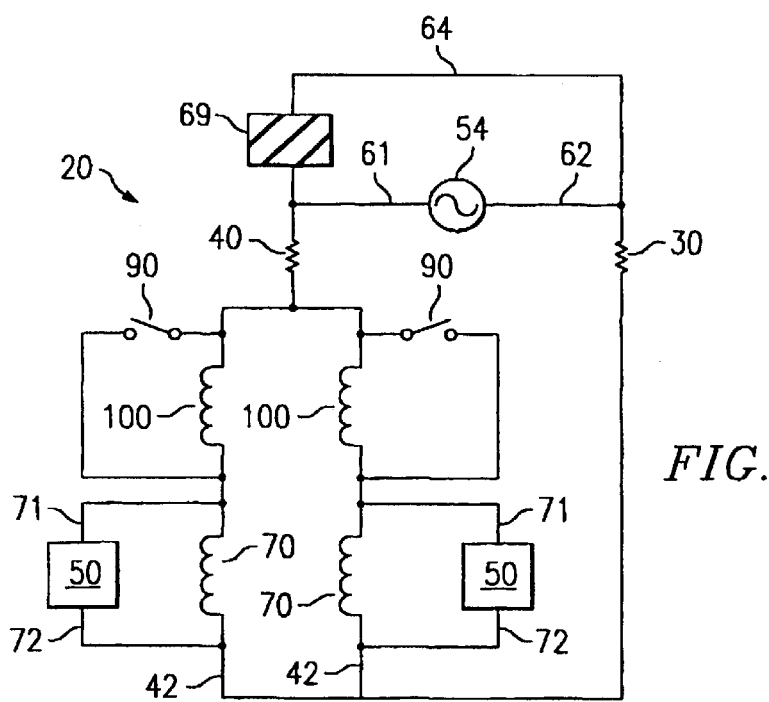
FIG. 5 is a simplified electrical schematic of the electrical circuit formed by the well of FIG. 4.
Figure 4:
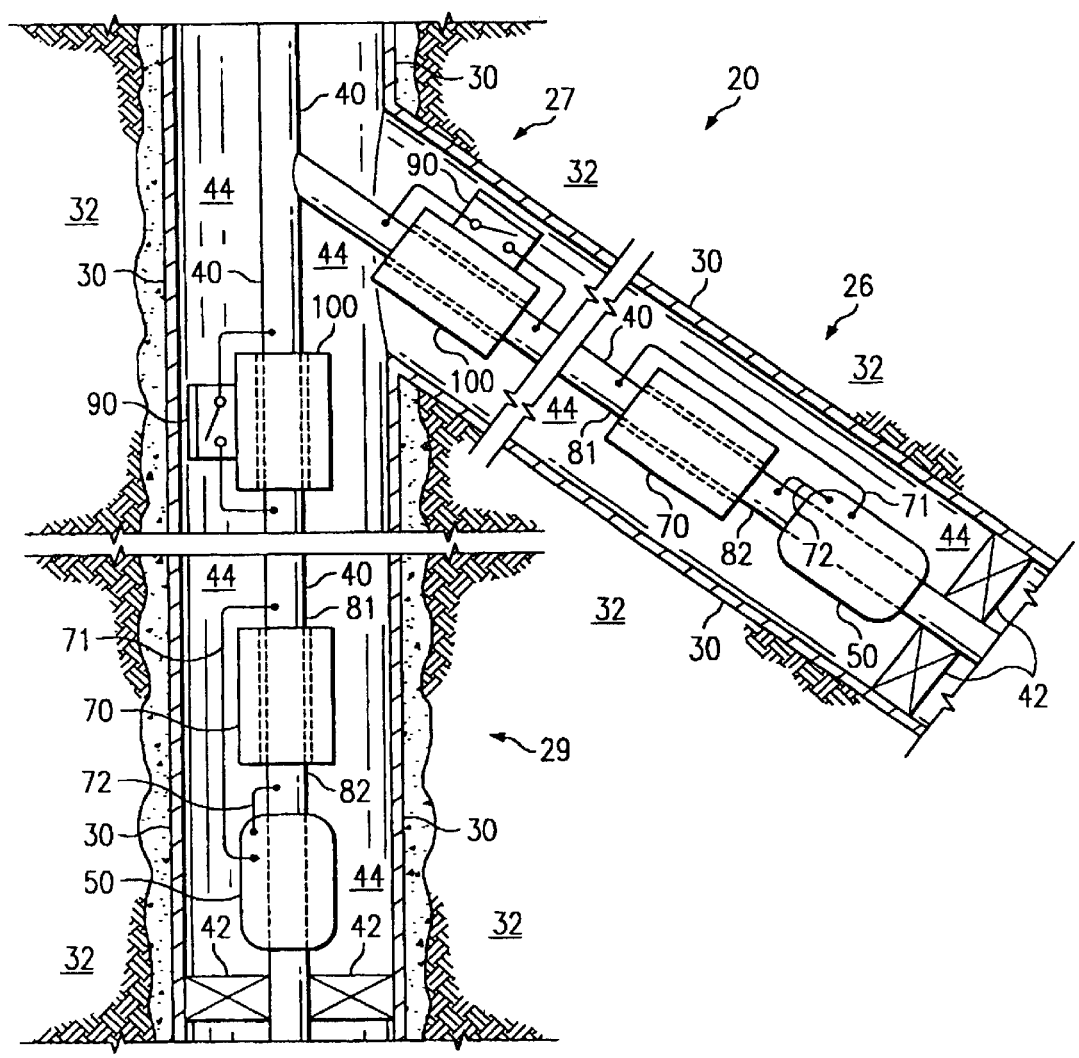
FIG. 4 is a schematic of still another preferred embodiment of the present invention.

The switch configurations and locations can vary to form other possible embodiments of the present invention. For example, the junction section 27, lower main borehole section 29, and lateral branch section 26 of FIG. 4 can be substituted into the well 20 of FIG. 1 to form another possible embodiment of the present invention. In FIG. 4 the switches 90 with their corresponding induction chokes 100 are located in the junction section 27, and the downhole devices 50 with their corresponding induction chokes 70 are located farther downhole within the lower main borehole section 29 and the lateral section 26, respectively. FIG. 5 is a simplified electrical schematic illustrating the electrical circuit formed when the sections 26, 27, and 29 of FIG. 4 are substituted into the well 20 of FIG. 1.

Figure 6:
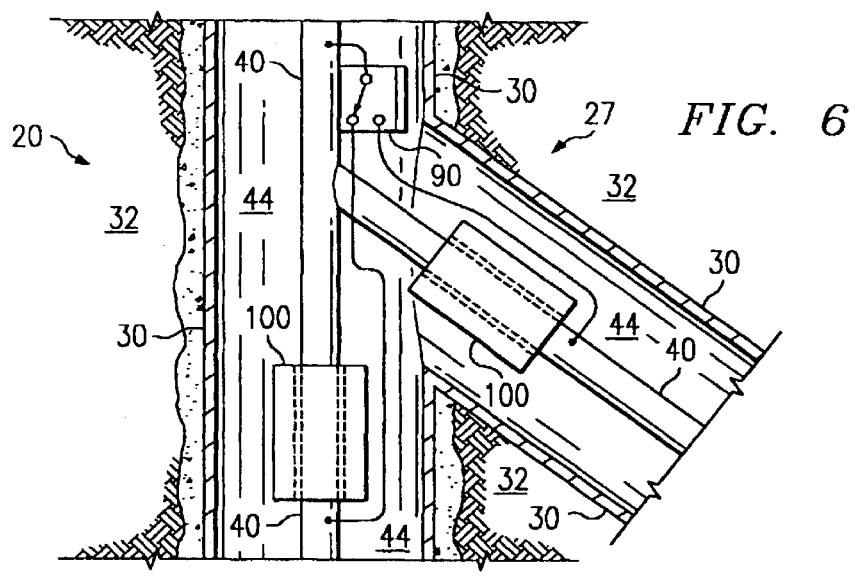
FIG. 6 is a schematic of another preferred embodiment of the present invention.
Figure 7:
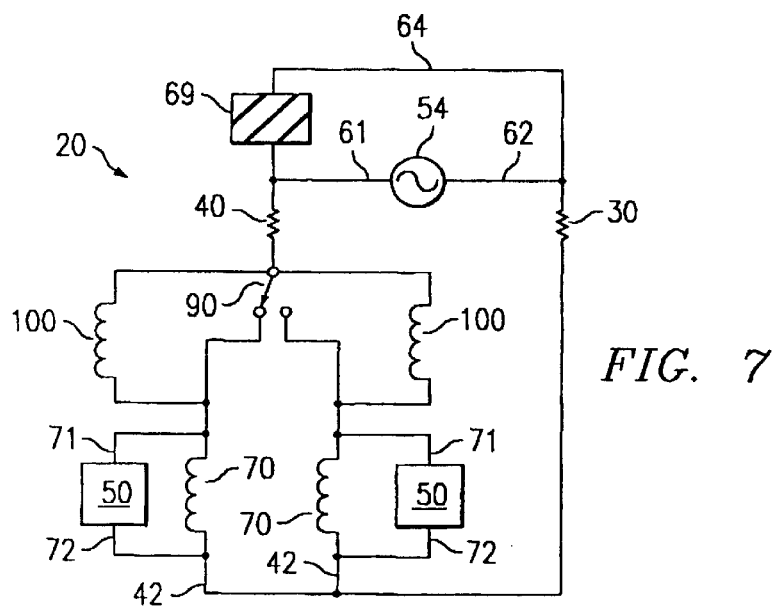
FIG. 7 is a simplified electrical schematic of the electrical circuit formed by the well of FIG. 6.

As another example of how the switch configurations and locations can vary, the junction section 27 of FIG. 6 can be substituted into the well 20 of FIGS. 1 and/or 4. In FIG. 6, a single switch 90 is used to direct the power and/or communications to either the lower main borehole section 29 or the lateral section 26, but not both. In alternative, the junction section 27 of FIG. 6 may comprise two switches in a single housing (not shown) or a three-way switch (not shown), either option being adapted to route power and/or communications to the lower main borehole section 29 and/or the lateral section 26. FIG. 7 is a simplified electrical schematic illustrating the electrical circuit formed when the junction section 27 of FIG. 6 is substituted into the well 20 of FIG. 1 with the lower main borehole section 29 and lateral section 26 of FIG. 4.

Figure 8:
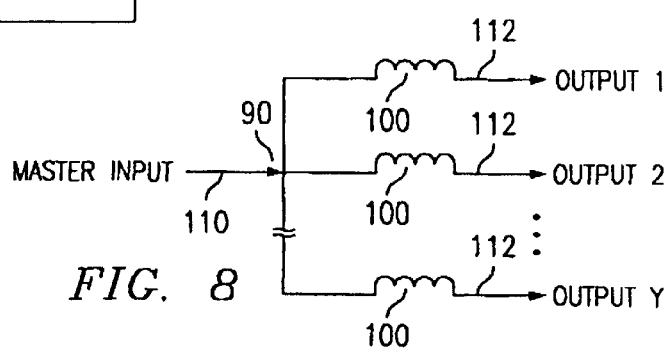
FIG. 8 is a diagram illustrating a generalized configuration having a master input that can be split into any number of outputs.

FIG. 8 is a diagram illustrating a generalized configuration where there is a master input 110 (e.g., from the surface computer system 52) that can be split into any number (Y) of outputs 112. The switch configuration may allow for only one output at a time (as in FIG. 6) or for any combination of outputs at a time (as in FIG. 4). Thus, generally a single master input 110 can branch into Y outputs 112. But also there may be any number (X) of master inputs 110 as well.

Figure 9:
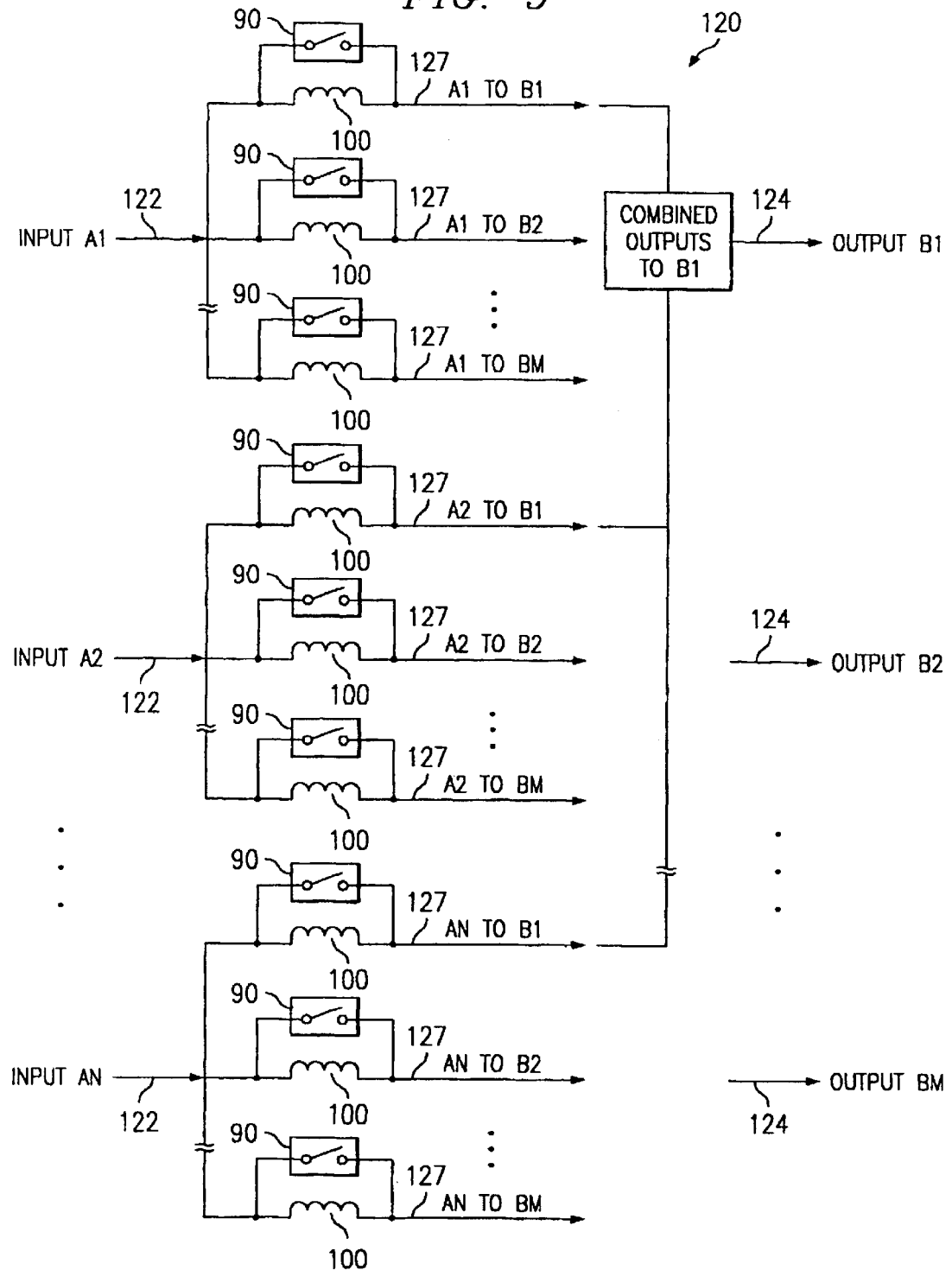
FIG. 9 is a diagram illustrating a reconfigurable power and communications transmission routing system.

FIG. 9 is another diagram illustrating how the present invention can provide a reconfigurable power and communications transmission routing system 120 for a well electrical circuit formed by a piping structure of the well. Such a routing system 120 formed by individually controllable switches 90 is capable of interconnecting each of the N input "lines" 122 to any one or more of the M output "lines" 124, where the "lines" are portions of the well piping structure (e.g., production tubing 40 and/or casing 30).

In the telecommunications industry, an analogous routing system for telephone lines is often called a "crossbar switch." A typical electrical crossbar switch in the telecommunications industry is a matrix of individually intersecting input "rows" and output "column" conductors with mechanical or transistorized switches positioned at each of the junctions of the orthogonal rows and columns. The switch at any particular junction may be uniquely addressed and energized so as to complete the connection between an intersecting input line and the output line. By energizing one and only one switch along a single input "row" line, a unique connection to an output "column" is achieved. The closed circuit may be used to convey electrical power or electrical signals from a source connected to the "input" line to a destination connected to the "output" line. In telephony, crossbar switches are used to route calls between a given source location to a particular destination location.

The diagram of FIG. 9 illustrates a generalized configuration where there is a network of intersecting tubing strings and/or casing sections of a well (i.e., network formed with well piping structure) forming N input lines 122 and M output lines 124. Each of the N input lines 122 is assumed to be connected to each of the M output lines 124 with an induction choke 100 and one or more by-pass switches 90 positioned at each junction 127. For example, there can be an independently addressable electronic or mechanical switch bridge (not shown) at each junction 127. Controller circuitry (not shown) can provide a way of achieving complete power and/or communications interconnection by activating the electronic or mechanical switches 90 and "shorting-out" or bypassing the respective induction chokes 100. The switches 90 may be biased in such a way so as to be normally open or normally closed when "inactive." That is, the normal non-energized state of each switch 90 may be either "off" (i.e., open) or "on" (i.e., closed). In a preferred embodiment of this invention, it is assumed that all switches are normally open (i.e., off). With all junction switches 90 in the naturally open position, the chokes 100 installed around the junction lines 127 block some, most, or all power and/or communication conveyance to the output lines 124 until a switch 90 is activated for a particular junction 127.

For example, if AC power is applied to input line A1 in FIG. 9, then the induction chokes 100 inhibits electrical energy from passing to output lines B1–BM. However, if an electrical command signal is issued to a by-pass control circuitry located across the choke junction A1-to-B2, then a corresponding electronic switch 90 is closed and the corresponding choke 100 is by-passed. Consequently, AC electrical energy and uninhibited communication signals are able to pass from input line A1 to output line B2. An additional electrical command could be issued to the by-pass control circuitry located across the choke junction A2-to-B7 (not shown) ordering the corresponding switch 90 to close and complete an additional electrical connection between input line A2 and output line B7. Thus, one possible application of the present invention is in achieving point-to-point power and/or communications connectivity between a number of input lines 122 and a number of output lines 124 in a network formed by the piping structures of a well.

As another example, if AC power is applied to input lines A1–AN in FIG. 9, then initially the induction chokes 100 inhibit the electrical energy from passing to output lines B1–BM. But if electrical command signals are issued to the by-pass control circuitry located at each choke junction for B1 (i.e., A1-to-B1, A2-to-B1, . . . AN-to-B1), then the corresponding switches 90 will be closed and the corresponding chokes 100 will be by-passed. Hence, all of the inputs A1–AN would be combined for output B1. Therefore with the present invention, a completely reconfigurable crossbar switch network system 120 may be achieved by installing a total of M*N chokes 100 and switches 90 across the junctions 127 between N input lines 122 and M output lines 124.

In the event that partial power and/or communication conveyance across the M-by-N grid 120 of FIG. 9 is desired for one or more junctions 127, or for all junctions 127, smaller chokes may be installed where desired so that the power and/or communications is not fully impeded at junctions 127 having the smaller chokes. A smaller choke may be physically smaller (i.e., less mass relative to the other chokes 100), and/or it may have different magnetic properties (i.e., comprising less ferromagnetic material therein). In other words, a smaller choke is one that provides less effective impedance to the AC flowing through the piping structure of the well. Hence, modest (i.e., attenuated) amounts of power may be delivered to equipment connected to a specific output line 124 for monitoring purposes (e.g., in the case of an interval control valve) while its corresponding choke by-pass switch 90 is in the open or "off" position. If full power needs to be directed to the equipment connected to the given output line 124 for other purposes (e.g., to open an interval control valve), then the corresponding choke by-pass switch 90 can be closed or turned "on." Therefore, the present invention provides a method and apparatus for switching and routing power and/or communications across a network of tubing strings 40 and/or casing sections 30 (i.e., piping structures) of a well.

The present invention can be applied to any type of petroleum well (e.g., exploration well, injection well, production well, rod-pumping or suction well) where downhole power is needed for electronics or electrical equipment in downhole devices. The present invention also may be applied to other types of wells (other than petroleum wells), such as a water production well.

The present invention can be incorporated multiple times into a single petroleum well having one or more production zones, or into a petroleum well having multiple lateral or horizontal completions extending therefrom. Because the configuration of a well is dependent on the natural formation layout and locations of the production zones, the number of applications or the arrangement of an embodiment of the present invention may vary accordingly to suit the formation, or to suit the power and/or communication needs of a well.

The present invention may also be applied in other fields (other than wells) where a piping structure can be implemented to form an electrical circuit by using the piping structure as electrical conductors and using induction chokes. Also, the present invention may be used in any application where existing members or structure of a system (e.g., structural members, fluid transmission members) are used to form an electrical circuit within the system with induction chokes rather than routing additional wiring. For example, the present invention may be implemented to controllably route power and/or communications through: an existing network of pipes of a sprinkler system in a building; an existing network of interconnecting metal structural members in a building; an existing network of interconnecting metal structural members for an oil rig; an existing pipeline network (e.g., water pipes), an existing network of interconnecting structural truss members in a bridge; and an existing network of interconnecting metal reinforcing bar for concrete reinforcement (e.g., in a road or dam).

It will be appreciated by those skilled in the art having the benefit of this disclosure that this invention provides a petroleum production well and a method of operating the well to provide a controllable downhole switching network for routing power and/or communications to downhole devices. It should be understood that the drawings and detailed description herein are to be regarded in an illustrative rather than a restrictive manner, and are not intended to limit the invention to the particular forms and examples disclosed. On the contrary, the invention includes any further modifications, changes, rearrangements, substitutions, alternatives, design choices, and embodiments apparent to those of ordinary skill in the art, without departing from the spirit and scope of this invention, as defined by the following claims. Thus, it is intended that the following claims be interpreted to embrace all such further modifications, changes, rearrangements, substitutions, alternatives, design choices, and embodiments.

The invention claimed is:

1. A system for controllably routing communications and electrical power having a time-varying current through a piping structure, comprising:
   a first induction choke located about a portion of a first branch of said piping structure;
   a second induction choke located about a portion of a second branch of said piping structure;
   a controllable switch comprising two switch terminals;
   a first of said switch terminals being electrically connected to said piping structure on a junction side of said induction chokes, wherein said first and second branches of said piping structure intersect on said junction side of said induction chokes; and
   a second of said switch terminals being electrically connected to said piping structure on another side of at least one of said induction chokes.

2. A system in accordance with claim 1, wherein said second switch terminal is electrically connected to said first branch of said piping structure on said another side of said first induction choke, and said controllable switch further comprising a third switch terminal, said third switch terminal being electrically connected to said second branch of said piping structure on said another side of said second induction choke.

3. A system in accordance with claim 1, wherein said second switch terminal is electrically connected to said first branch of said piping structure on said another side of said first induction choke, and further comprising a second controllable switch, said second controllable switch being electrically connected between said piping structure on a junction side of said induction chokes and said second branch of said piping structure on said another side of said second induction choke, such that each of said electrically controllable switches are electrically connected across each of the induction chokes, respectively.

4. A system in accordance with claim 1, wherein said second switch terminal is electrically connected to said piping structure via a downhole device.

5. A system in accordance with claim 4, wherein said downhole device comprises an electronic device.

6. A system in accordance with claim 4, wherein said downhole device comprises an electrically powered device.

7. A system in accordance with claim 4, wherein said downhole device comprises a modem.

8. A system in accordance with claim 1, wherein said first switch terminal is electrically connected to said piping structure via a downhole device.

9. A system in accordance with claim 8, wherein said downhole device comprises an electronic device.

10. A system in accordance with claim 8, wherein said downhole device comprises an electrically powered device.

11. A system in accordance with claim 8, wherein said downhole device comprises a modem.

12. A system in accordance with claim 1, wherein said piping structure is part of a well.

13. A system in accordance with claim 12, wherein said well is a petroleum production well.

14. A petroleum well for producing petroleum products comprising:
   a piping structure extending within said well; and
   a system for controllably routing communications and electrical power having a time-varying current through said piping structure, said system comprising:
      a first induction choke located about a portion of a first branch of said piping structure,
      a second induction choke located about a portion of a second branch of said piping structure,
      a controllable switch comprising two switch terminals,
      a first of said switch terminals being electrically connected to said piping structure on a junction side of said induction chokes, wherein said first and second branches of said piping structure intersect on said junction side of said induction chokes, and
      a second of said switch terminals being electrically connected to said piping structure on another side of at least one of said induction chokes.

15. A petroleum well in accordance with claim 14, wherein said second switch terminal is electrically connected to said first branch of said piping structure on said another side of said first induction choke, and said controllable switch further comprising a third switch terminal, said third switch terminal being electrically connected to said second branch of said piping structure on said another side of said second induction choke.

16. A petroleum well in accordance with claim 15, further comprising:
   a third induction choke being located about another portion of said first branch of said piping structure farther downhole relative to said first induction choke,
   a fourth induction choke being located about another portion of said second branch of said piping structure farther downhole relative to said second induction choke,
   a first downhole device electrically connected to said first branch of said piping structure from one side of said third induction choke to another side of said third induction choke, such that said first downhole device is electrically connected across said third induction choke; and
   a second downhole device electrically connected to said second branch of said piping structure from one side of said fourth induction choke to another side of said fourth induction choke, such that said second downhole device is electrically connected across said fourth induction choke.

17. A petroleum well in accordance with claim 16, wherein at least one of said downhole devices comprises an electronic device.

18. A petroleum well in accordance with claim 16, wherein at least one of said downhole devices comprises an electrically powered device.

19. A petroleum well in accordance with claim 16, wherein at least one of said downhole devices comprises a modem.

20. A petroleum well in accordance with claim 14, wherein said second switch terminal is electrically connected to said first branch of said piping structure on said another side of said first induction choke, and further comprising a second controllable switch, said second controllable switch being electrically connected between said piping structure on said junction side of said second induction choke and said second branch of said piping structure on said another side of said second induction choke, such that each of said electrically controllable switches are electrically connected across each of the induction chokes.

21. A petroleum well in accordance with claim 20, further comprising:
   a third induction choke being located about another portion of said first branch of said piping structure relative to said first induction choke,
   a fourth induction choke being located about another portion of said second branch of said piping structure relative to said second induction choke,
   a first downhole device electrically connected to said first branch of said piping structure from one side of said third induction choke to another side of said third induction choke, such that said first downhole device is electrically connected across said third induction choke; and
   a second downhole device electrically connected to said second branch of said piping structure from one side of said fourth induction choke to another side of said fourth induction choke, such that said second downhole device is electrically connected across said fourth induction choke.

22. A petroleum well in accordance with claim 21, wherein at least one of said downhole devices comprises an electronic device.

23. A petroleum well in accordance with claim 21, wherein at least one of said downhole devices comprises an electrically powered device.

24. A petroleum well in accordance with claim 21, wherein at least one of said downhole devices comprises a modem.

25. A petroleum well in accordance with claim 14, wherein said second switch terminal is electrically connected to said piping structure via a downhole device.

26. A petroleum well in accordance with claim 25, wherein said downhole device comprises an electronic device.

27. A petroleum well in accordance with claim 25, wherein said downhole device comprises an electrically powered device.

28. A petroleum well in accordance with claim 25, wherein said downhole device comprises a modem.

29. A petroleum well in accordance with claim 14, wherein said first switch terminal is electrically connected to said piping structure via a downhole device.

30. A petroleum well in accordance with claim 29, wherein said downhole device comprises an electronic device.

31. A petroleum well in accordance with claim 29, wherein said downhole device comprises an electrically powered device.

32. A petroleum well in accordance with claim 29, wherein said downhole device comprises a modem.

33. A petroleum well in accordance with claim 14, wherein said piping structure comprises at least a portion of a production tubing.

34. A petroleum well in accordance with claim 14, wherein said piping structure comprises at least a portion of a well casing.

35. A petroleum well for producing petroleum products comprising:
- a well casing extending into a formation;
- a production tubing extending within said casing;
- a power source located at the surface, said power source being electrically connected to, and adapted to output a time-varying current into, at least one of said tubing and said casing;
- a first induction choke located downhole about a portion of a first branch of at least one of said tubing and said casing;
- a second induction choke located downhole about a portion of a second branch of at least one of said tubing and said casing;
- a controllable switch located downhole and comprising two switch terminals;
- a first of said switch terminals being electrically connected to at least one of said tubing and said casing on a junction side of said induction chokes, wherein said first and second branches intersect on said junction side of said induction chokes;
- a second of said switch terminals being electrically connected to at least one of said tubing and said casing on another side of at least one of said induction chokes;
- a first downhole device electrically connected to said first branch; and
- a second downhole device electrically connected to said second branch.

36. A method of producing petroleum products from a petroleum well, comprising the steps of:
- providing a piping structure that extends within said well;
- providing an electrical power source that is located at the surface, that is electrically connected to said piping structure, and that is adapted to output a time-varying current;
- providing a first induction choke that is located about a portion of a first branch of said piping structure;
- providing a second induction choke that is located about a portion of a second branch of said piping structure;
- providing a controllable switch that comprises two switch terminals, wherein a first of said switch terminals is electrically connected to said piping structure on a junction side of said induction chokes, wherein said first and second branches of said piping structure intersect on said junction side of said induction chokes, and wherein a second of said switch terminals is electrically connected to said piping structure on another side of at least one of said induction chokes;
- providing a downhole device that is electrically connected to said piping structure;
- imparting said time-varying current into said piping structure with said power source;
- controlling a switch position of said controllable electric switch;
- routing said time-varying current around at least one of said induction chokes into at least one of said first and second branches of said piping structure with said controllable electric switch;
- routing said time-varying current through said downhole device;
- providing electrical power to said downhole device during petroleum production operations with said power source via said piping structure; and
- producing petroleum products from said well.

37. A method in accordance with claim 36, wherein said second switch terminal is electrically connected to said first branch of said piping structure on said another side of said first induction choke, and wherein said controllable switch further comprises a third switch terminal, said third switch terminal being electrically connected to said second branch of said piping structure on said another side of said second induction choke.

38. A method in accordance with claim 36, wherein said second switch terminal is electrically connected to said first branch of said piping structure on said another side of said first induction choke, and further comprising the steps of:
- providing a second controllable switch that is electrically connected between said piping structure on a junction side of said second induction choke and said second branch of said piping structure on said another side of said second induction choke, such that each of said electrically controllable switches are electrically connected across each of the induction chokes, respectively; and
- controlling a switch position of said second controllable electric switch.

* * * * *